US012354461B2

(12) United States Patent
Lamb et al.

(10) Patent No.: US 12,354,461 B2
(45) Date of Patent: *Jul. 8, 2025

(54) TEMPORARY SECURITY BYPASS METHOD AND APPARATUS

(71) Applicant: Universal Electronics Inc., Scottsdale, AZ (US)

(72) Inventors: Michael Lamb, Rancho Santa Fe, CA (US); Carlo Q. Petrucci, San Marcos, CA (US)

(73) Assignee: Universal Electronics Inc., Scottsdale, AZ (US)

( * ) Notice: Subject to any disclaimer, the term of this patent is extended or adjusted under 35 U.S.C. 154(b) by 289 days.

This patent is subject to a terminal disclaimer.

(21) Appl. No.: 17/141,364

(22) Filed: Jan. 5, 2021

(65) Prior Publication Data

US 2021/0125485 A1 Apr. 29, 2021

Related U.S. Application Data

(62) Division of application No. 16/677,167, filed on Nov. 7, 2019, now Pat. No. 10,896,595, which is a division of application No. 15/963,201, filed on Apr. 26, 2018, now Pat. No. 10,482,755, which is a division of application No. 15/005,724, filed on Jan. 25, 2016, now Pat. No. 9,959,745, which is a division of application No. 13/433,169, filed on Mar. 28, 2012, now Pat. No. 9,245,439.

(51) Int. Cl.
*G08B 25/00* (2006.01)
*G08B 13/02* (2006.01)

(52) U.S. Cl.
CPC ........... *G08B 25/008* (2013.01); *G08B 13/02* (2013.01)

(58) Field of Classification Search
CPC ...... G08B 25/008; G08B 13/02; G08B 21/00; G08B 13/00
See application file for complete search history.

(56) References Cited

U.S. PATENT DOCUMENTS

| | | | | |
|---|---|---|---|---|
| 5,086,385 A * | 2/1992 | Launey | G08B 25/14 | 700/83 |
| 5,835,015 A * | 11/1998 | Ikeda | G11B 27/36 | 340/568.1 |
| 5,936,522 A | 8/1999 | Vogt | | |
| 6,225,903 B1 | 5/2001 | Soloway et al. | | |
| 7,711,796 B2 * | 5/2010 | Gutt | H04L 41/0803 | 709/217 |
| 8,577,392 B1 * | 11/2013 | Pai | H04W 4/029 | 455/456.3 |
| 9,542,832 B1 * | 1/2017 | Fu | G08B 29/185 | |
| 9,589,446 B1 * | 3/2017 | Dey | G08B 25/008 | |
| 9,685,071 B1 * | 6/2017 | Fu | G08B 25/005 | |
| 9,805,583 B2 * | 10/2017 | Dey | G08B 25/008 | |

(Continued)

*Primary Examiner* — Curtis J King
(74) *Attorney, Agent, or Firm* — Greenberg Traurig, LLP

(57) ABSTRACT

A method, system, and apparatus for temporarily disarming a barrier alarm in a security system. In one embodiment, a method is described, performed by a barrier alarm in communication with a central controller, where the barrier alarm receives a first signal from a user interface on the barrier alarm to disarm the barrier alarm, disables the barrier alarm in response to receiving the indication, and re-arming the barrier alarm upon receipt of a second signal from a sensor that forms part of the barrier alarm.

13 Claims, 9 Drawing Sheets

(56) References Cited

U.S. PATENT DOCUMENTS

2001/0025349 A1* 9/2001 Sharood ............ G06Q 30/0241 713/340
2001/0029585 A1* 10/2001 Simon ................ G08B 25/008 726/4
2003/0065407 A1* 4/2003 Johnson ............... G05B 15/02 700/19
2004/0090327 A1 5/2004 Soloway et al.
2004/0172657 A1* 9/2004 Phillips ................ H04B 3/546 725/110
2005/0193429 A1* 9/2005 Demopoulos ....... H04L 63/1408 726/23
2005/0280529 A1* 12/2005 Hinkson ................ G08B 3/10 340/539.1
2006/0092011 A1* 5/2006 Simon ............. G08B 13/19693 340/521
2006/0181401 A1* 8/2006 Martin ................ G08B 15/002 340/506
2007/0069894 A1 3/2007 Lee et al.
2007/0220907 A1* 9/2007 Ehlers ................. F25B 49/005 62/126
2008/0094202 A1* 4/2008 Martin ................ G08B 25/008 340/506
2008/0162364 A1* 7/2008 Martin .................. H04L 63/08 705/75
2008/0186173 A1 8/2008 Gates
2009/0140858 A1 6/2009 Gore et al.
2009/0167862 A1* 7/2009 Jentoft ............ G08B 13/19695 348/143
2010/0023865 A1* 1/2010 Fulker .................. G08B 25/14 700/286
2011/0015797 A1* 1/2011 Gilstrap ................ G05B 15/02 700/291
2011/0026568 A1 2/2011 Hadizad et al.
2011/0046792 A1* 2/2011 Imes ...................... H02J 3/382 700/278
2011/0074561 A1* 3/2011 Mackjust ............... B60R 25/10 340/5.72
2011/0172836 A1* 7/2011 Boss ..................... G06Q 50/06 700/291
2012/0169487 A1* 7/2012 Poder .................... G08B 25/10 340/426.15
2013/0057404 A1 3/2013 Thibault
2013/0076507 A1* 3/2013 Petricoin, Jr. ........... H04N 7/14 340/539.11
2013/0076513 A1 3/2013 Eskildsen et al.
2013/0151012 A1* 6/2013 Shetty .................. H02J 3/0075 700/276
2013/0331087 A1* 12/2013 Shoemaker .......... H04W 4/029 455/420
2014/0070959 A1* 3/2014 Bhargava ............. H04L 12/282 340/870.07
2014/0099926 A1* 4/2014 Haghgou ............. H04M 1/677 455/410
2014/0253316 A1* 9/2014 Addy .................... G05B 15/02 340/506
2014/0266719 A1* 9/2014 Dunn .................... G06Q 10/06 340/541
2014/0313032 A1* 10/2014 Sager .................. G08B 25/003 340/539.17
2015/0052578 A1* 2/2015 Yau ....................... G08B 25/10 726/3
2015/0148965 A1* 5/2015 Lemire .................. H04W 4/20 700/276
2016/0013646 A1* 1/2016 Akerson .................. H02J 3/14 307/39
2016/0054023 A1* 2/2016 Baker ................. H05B 47/115 307/31
2016/0182535 A1* 6/2016 Probin ............... H04L 43/0805 726/22
2016/0189526 A1* 6/2016 Kennedy ............. G08B 25/008 340/541
2016/0189532 A1* 6/2016 Malhotra ............ G08B 25/008 340/506
2016/0234232 A1* 8/2016 Poder ................. H04L 63/1408
2016/0266606 A1* 9/2016 Ricci ....................... G06F 1/163
2016/0300463 A1* 10/2016 Mahar .................... H04N 7/181
2017/0213447 A1* 7/2017 Horrocks .............. G08B 19/00
2017/0221343 A1* 8/2017 Dey ....................... G08B 13/08
2018/0047265 A1* 2/2018 Rodolico ............ G08B 29/188
2018/0047278 A1* 2/2018 Dey ..................... G08B 25/008
2018/0102044 A1* 4/2018 Lamb ..................... G08B 13/08
2020/0134237 A1* 4/2020 Rexilius .................. G06F 21/79
2020/0184114 A1* 6/2020 Leiserson ............ H04L 9/3247

* cited by examiner

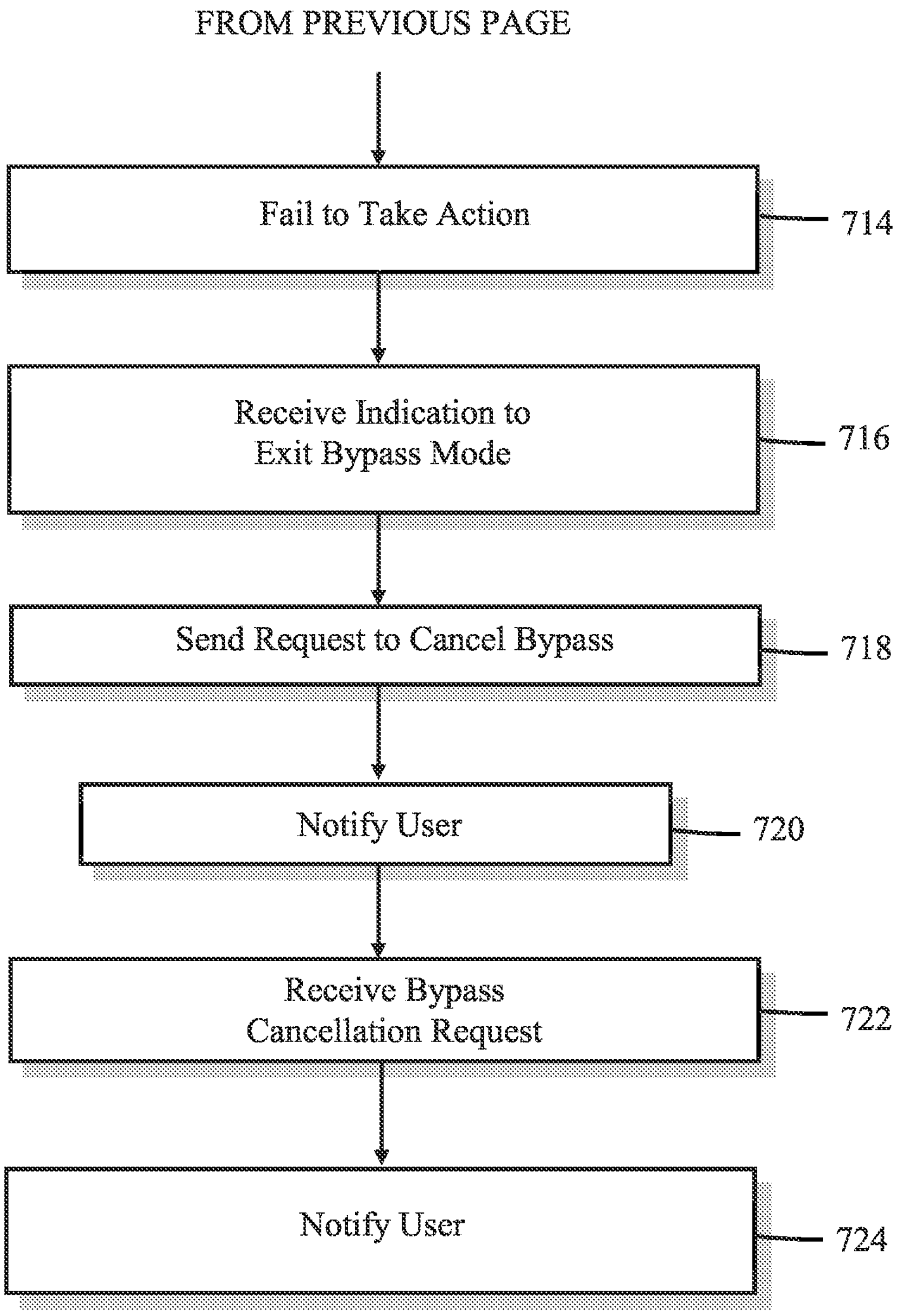
FIG. 7 (Con't)

TEMPORARY SECURITY BYPASS METHOD AND APPARATUS

CROSS-REFERENCE TO RELATED APPLICATIONS

This application is a divisional of U.S. patent application Ser. No. 16/677,167, filed on Nov. 7, 2019, which is a divisional of U.S. patent application Ser. No. 15/963,201, filed on Apr. 26, 2018, now U.S. Pat. No. 10,482,755, which is a divisional of U.S. patent application Ser. No. 15/005,724, filed on Jan. 25, 2016, now U.S. Pat. No. 9,959,745, which is a divisional of U.S. patent application Ser. No. 13/433,169, filed on Mar. 28, 2012, now U.S. Pat. No. 9,245,439.

BACKGROUND

Field of Use

The present application relates to the field of home security. More specifically, the present application relates to temporarily dis-arming barrier alarms typically used in home and business security systems.

Description of the Related Art

Security systems for homes and offices have been around for many years. Often, these systems make use of barrier alarms, such as door and window sensors installed onto some or all of the doors and windows found in a structure, motion detectors, sound detectors, etc. In the case of door and window alarms, they typically comprise two distinct parts: a magnet and a reed switch assembly. The reed switch assembly is typically installed onto a movable part of a window or onto a door edge, while the magnet is mounted to a stationary surface, such as a door or window frame. When the door or window is closed, the magnet and reed switch are in close proximity to one another, maintaining the reed switch in a first state indicative of a "no alarm" condition. If the door or window is opened, proximity is lost between the magnet and the reed switch, resulting in the reed switch changing state, e.g., from closed to open or from open to closed. The change of state is indicative of a local alarm condition, and a signal may be generated by circuitry located within the reed switch assembly and sent, via wires or over-the-air, to a central controller, either in the home or at a remote monitoring station. Alternatively, or in addition, a loud audible alert is generated, either at the central controller in the home or directly by the circuitry within the reed switch assembly, indicating that a door or window has been opened without authorization.

One of the disadvantages of typical door and window alarm systems is that they do not allow occupants to easily open doors or windows without first turning off the alarm system at the central controller. It is often inconvenient for the occupant to disarm the system, as the central controller and the door or window of interest may be located a great distance from one another.

Another disadvantage of prior art door/window security systems is that while the security system is disabled at the controller, intruders may enter the premises through the now un-monitored doors or windows without detection, as the entire security system may be disabled when it is desired to open a single door or window.

Thus, it would be desirable to provide a security system that allows occupants to open doors or windows without having to disable a security system at the central controller.

SUMMARY

The embodiments described herein relate to methods, systems, and apparatus for temporarily disarming a barrier alarm in a security system. In one embodiment, a method is described, performed by a barrier alarm in communication with a central controller, the method comprising receiving a first signal, by a processor within the barrier alarm from a user interface on the barrier alarm, to disarm the barrier alarm, disabling, by the processor, the barrier alarm in response to receiving the indication, and re-arming, by the processor, the barrier alarm upon receipt of a second signal from a sensor that forms part of the barrier alarm.

In another embodiment, a method is performed by a central controller for temporarily ignoring local alarm signals from a barrier alarm in communication with the central controller, the method comprising receiving, by the central controller, a command from the barrier alarm for the central controller to ignore subsequent local alarm signals from the barrier alarm, after receipt of the command, receiving a local alarm signal from the barrier alarm, and refraining from performing one or more actions normally taken by the central controller in response to receiving a local alarm signal from the barrier alarm.

In another embodiment, a barrier alarm is described, having a capability of being temporary disarmed, the barrier alarm in communication with a central controller, the barrier alarm for monitoring signals provided by a sensor associated with the barrier alarm, comprising a sensor for detecting when a barrier monitored by the barrier alarm is in a closed position, a user input device for receiving an indication from a user to disarm the barrier alarm, a memory for storing processor-executable instructions, and a processor for executing the processor-executable instructions that causes the barrier alarm to disarm the barrier alarm in response to receiving the indication by the processor, and re-arm the barrier alarm upon receipt of a signal from the sensor by the processor.

In yet another embodiment, a central controller is described for temporarily ignoring local alarm signals from a barrier alarm in communication with the central controller, comprising, a receiver for receiving local alarm signals and commands from the barrier alarm, a memory for storing processor-executable instructions, and a processor for executing the processor-executable instructions that causes the barrier alarm to receive, by the central controller, a command from the barrier alarm for the central controller to ignore subsequent local alarm signals from the barrier alarm, after receipt of the command, receive a local alarm signal from the barrier alarm, and refrain from performing one or more actions normally taken by the central controller in response to receiving a local alarm signal from the barrier alarm.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

The present description relates to security methods and apparatus for temporarily disarming a barrier alarm. For the purpose of the discussions herein, the term "barrier alarm" means any device used to monitor and report states, physical conditions, attributes, status, or parameters of something being monitored, such as a door, window, open space, room, gate. Examples of barrier alarms comprise door and window sensors, motion detectors, passive infrared detectors, sound detectors, light interruption detectors, etc.

Simple barrier alarms have been available for years, typically comprising a magnet and a reed switch assembly. One of these components is mounted to a door or window frame and the other is mounted to a door or movable portion of a window. When the door or window is in a closed position, the two components are in close proximity to each other such that the reed switch assembly senses the magnetic field generated by the magnet, causing the reed switch to reside in a first state (either open or closed). When the door or window is opened, the door or window-mounted component moves away from the other component, such that the magnetic field sensed by the reed switch assembly is reduced or eliminated. As a result, the state of the reed switch changes (e.g., from open to closed or from closed to open), and this state change may be detected by electronic circuitry in the reed switch assembly. The electronic circuitry may within the reed switch assembly may, in response, sound an audible alarm and/or illuminate a warning light at the reed switch assembly, and/or transmit an RF signal to a central controller located remotely from the barrier alarm. The RF signal may indicate that a state change of the reed switch has occurred, which in turn causes the central controller to perform one or more actions, such as notify remote monitoring station 124, cause an audible and/or visual alarm (either at the controller or at a remote location), and/or provide an indication of a location where the local alarm condition occurred (e.g., front door, bedroom1 window, etc.).

Other types of barrier alarms are also available that eliminate the need for a magnet. Such alarms utilize door or window acceleration/deceleration to determine whether a door or window has been opened or closed, and may be packaged in a single unit that is mounted to a door or movable portion of a window.

Figure 1:
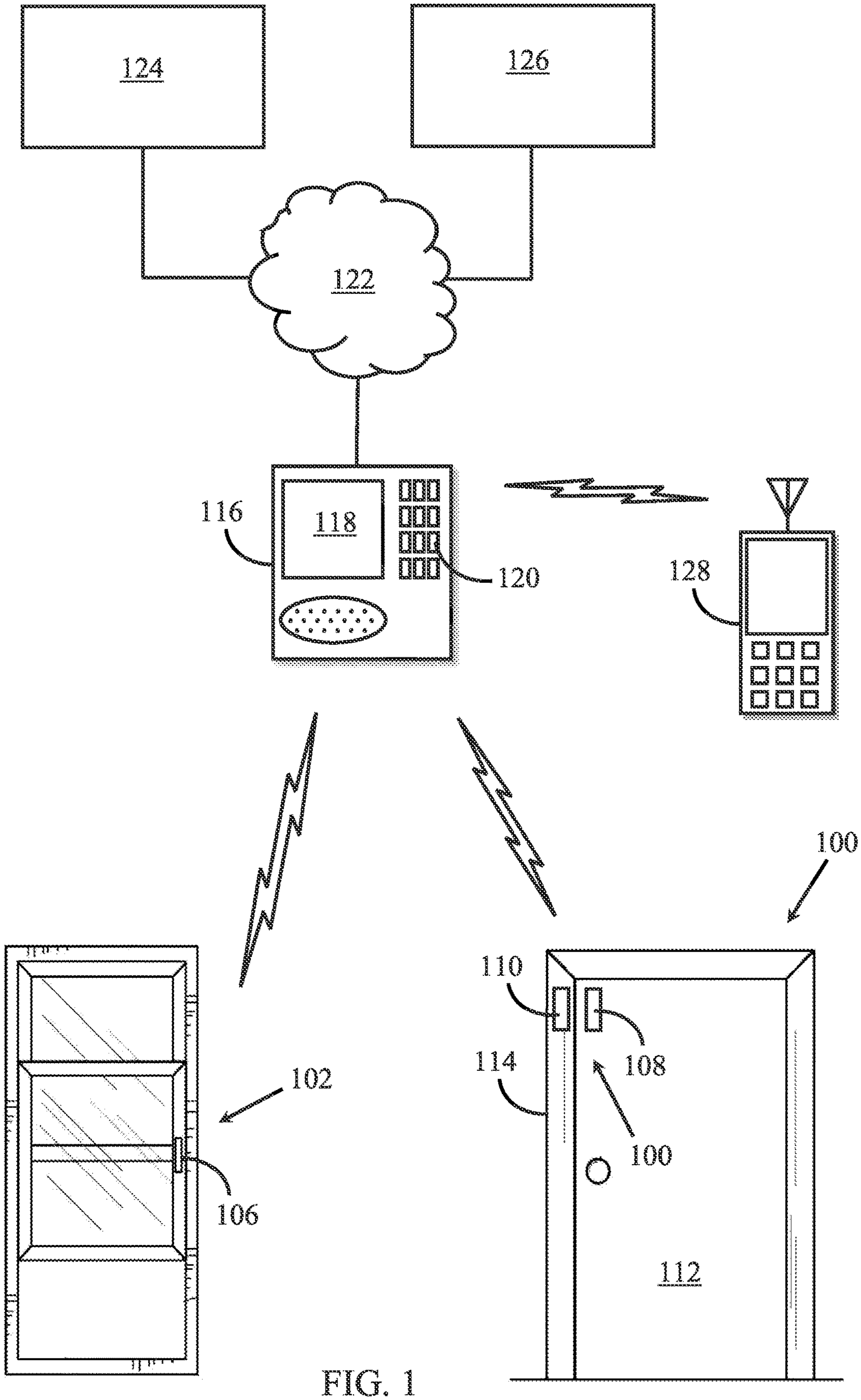
FIG. 1 is an illustration of a security system in accordance with one embodiment of the principles discussed herein.

FIG. 1 is an illustration of a security system in accordance with one embodiment of the principles discussed herein. In this embodiment a door assembly 100 and a window assembly 102 are monitored by barrier alarms 104 and 106, respectively. Barrier alarm 104 comprises magnet 108 mounted to door 112 and reed switch assembly 110 mounted to door frame 114, while barrier alarm 106 comprises a magnet-less type sensor, as described above.

Each of the barrier alarms communicates with central controller 116, typically using wireless RF signals generated by the barrier alarms and/or central controller 116. For example, if door 112 is opened, reed switch assembly 110 detects a reduction or elimination of a magnetic field produced by magnet 108 as magnet 108 moves away from reed switch assembly 110 as door 112 is opened. In response, reed switch assembly 110 transmits a message to central controller 116 indicative of a local alarm condition, e.g., door 112 has been opened.

In some embodiments, central controller 116 may send messages to either of the barrier alarms requesting a status of either alarm, e.g., either "open" or "closed". In response, one or both barrier alarms may transmit a response to central controller 116 indicating a status of the door or window, as the case may be. Other commands may be transmitted by central controller 116, such as "sound alarm", "turn on lights", open gate, lock doors, etc.

As described above, central controller 116 performs monitoring of barrier alarms 104, 106, and other security devices (for example, a tilt sensor, shock sensor, motion detector, passive infra-red detector, light interruption detector, etc.) that may be part of the security system. In addition, central controller 116 generally provides status information to central controller display 118, generally providing a visual indication of the status ("open", "closed", "on", "off", "normal", "alarm", etc.) of each barrier alarm or other security devices in the system. Central controller 116 may also be in communication with an off-site remote monitoring station 124 via communication network 122, such as the Internet, PSTN, a fiber optic communication network, a wireless communication network (e.g., cellular, data, satellite, etc.), and/or other wide-area network. Remote monitoring station 124 typically provides security monitoring services for homes and businesses equipped with security systems such as the one shown in FIG. 1. Remote monitoring station 124 is adapted to receive communications from central controller 116 via network 122 in response to central controller 116 receiving an indication of a local alarm condition being sensed by one or more barrier alarms/sensors in the security system. In other embodiments, central controller 116 simply receives raw data from the barrier alarms and determines, based on the data, whether a local alarm condition has occurred. When a local alarm condition is detected, central controller 116 generates a system alarm which may comprise taking one or more actions, such as notifying remote monitoring station 124 that a local alarm condition has occurred, illuminating one or more lights, sounding one or more audible alerts, etc.

Central controller 116 may be operated via keypad 120, which allows a user of the security system to enter information into the system and to get status information from central controller 116 via display 118. Users may, alternatively or in addition, provide information to, and receive information from, central controller 116 via a wireless communication device 128 (such as a smartphone, tablet computing device, or other mobile computing device) and/or a remote device 126 (such as a fixed or portable computer, smartphone, tablet computing device, or other mobile computing device) via a wireless or wired communication channel with network 122.

Figure 2A:
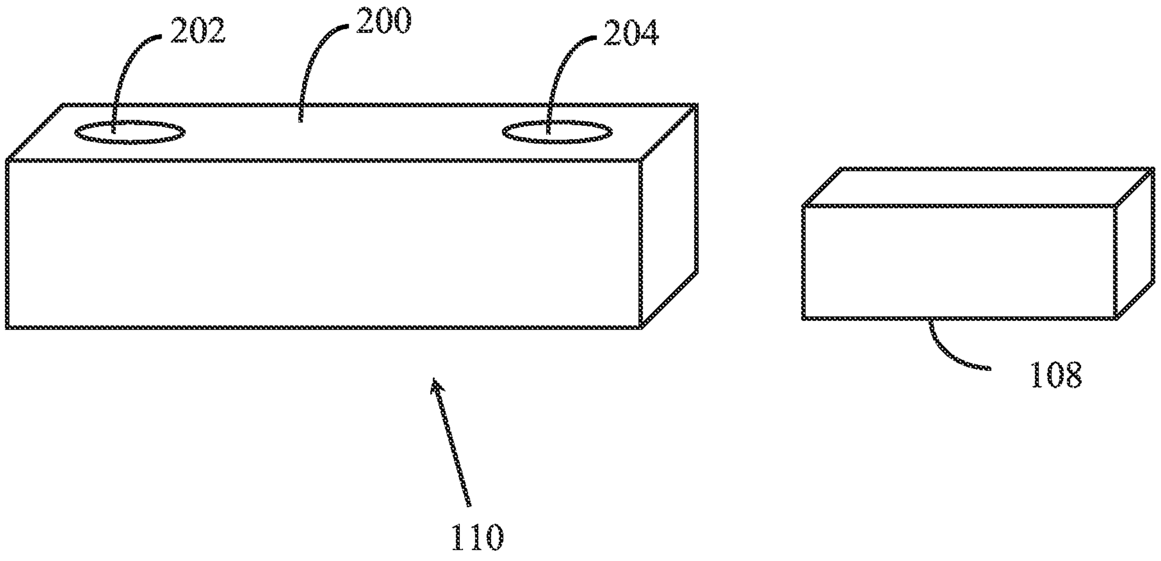
FIG. 2*a* is a perspective view of one embodiment of a barrier alarm, comprising a magnet and a reed switch assembly.

FIG. 2*a* is a perspective view of one embodiment of a barrier alarm, comprising magnet 108 and reed switch assembly 110. Reed switch assembly comprises housing assembly 200 that covers a reed switch, electronic circuitry, and a battery (not shown) used to detect the presence or absence of a magnetic field produced by magnet 108 and to transmit information to central controller 116 relating to the status of a door or window.

The barrier alarm shown in FIG. 2*a* further comprises a user input device 202 for use in temporarily disarming the barrier alarm. Such a device may comprise a mechanical switch (i.e., pushbutton, momentary pushbutton, toggle, slide, etc.), an opto-electrical switch, a heat sensing device (to detect the presence of a human finger), a capacitive sensor, or any other type of switch or sensor to provide an indication to the barrier alarm that a user wishes to temporarily disarm the barrier alarm. It may be desirable to temporarily disarm the barrier alarm if a user wishes to, for example, open a door or window without having to disarm the entire security system at central controller 116.

The barrier alarm shown in FIG. 2*a* may further comprise status indicator 204, used to convey the status of the barrier alarm as being armed or disarmed, the term "armed" referring to an ability to detect and/or report an event (e.g., movement of a door or window, closing/opening of a door or window, etc.), and the term "disarmed" referring to a condition where the barrier alarm cannot detect and/or report an event. Status indicator 204 may comprise an LED, LCD, or any other device for providing a visual status of the barrier alarm, or it may comprise a device capable of emitting audible tones, messages, alerts, etc., that also indicate a status of the barrier alarm. In one embodiment, indicator 204 comprises a multi-color LED, for example an LED package that is able to produce red light and a green light, red for indicating that the barrier alarm is disabled and green for indicating that the barrier alarm is armed. Of course, other colors may be used to differentiate between an armed and unarmed condition. In other embodiments, two or more visual indicators may be used to convey status.

Figure 2B:
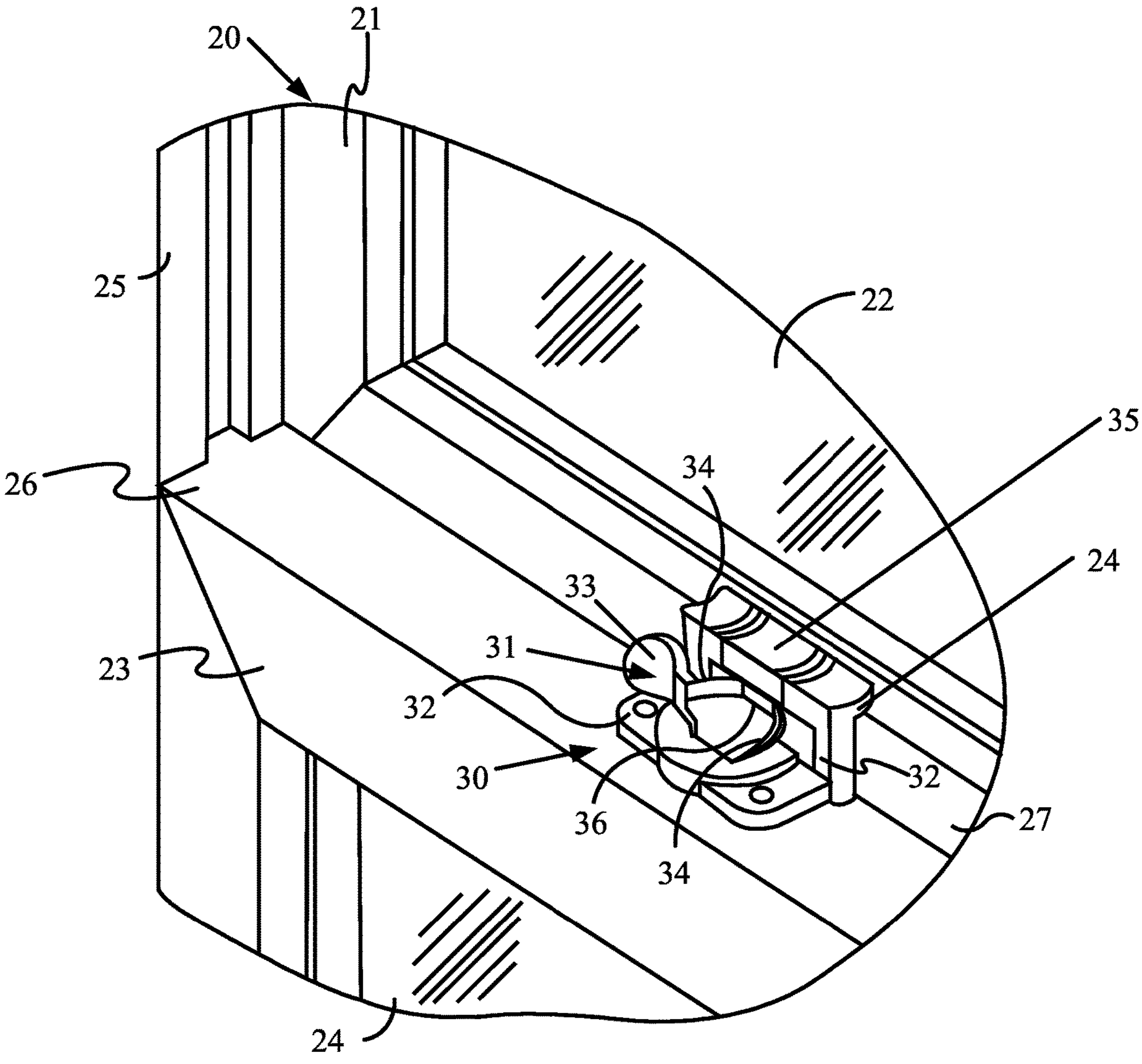
FIG. 2*b* illustrates another embodiment of a barrier alarm used in conjunction with a window and lock.

FIG. 2*b* illustrates another embodiment of a barrier alarm used in conjunction with a window 20 and lock 30, although the barrier alarm itself is hidden underneath lock 30, disposed within lower frame member 23, as will be described more in detail with respect to the description of FIG. 3. The window 20 comprises, for example, a double hung type window including an upper movable frame member 21 accommodating an upper pane 22 and a lower movable frame member 23 accommodating a lower pane 24. The upper frame member 21 and the lower frame member 23 are slidably fitted into a window frame 25 mounted to an opening (not shown) of a wall of the premises. The upper frame member 21 and the lower frame member 23 can be moved upwardly and downwardly or rotated around a hinge (not shown), to provide an access to the monitored premises.

The window 20 further includes lock 30 mounted to the window 20 for locking and unlocking the window 20. The lock 30 includes a latch 31 pivotably fixed to an upper rail 26 of the lower frame member 23 through a support member 32. The latch 31 includes a finger lever 33 for pivoting the latch 31 by a finger, and a curved latching cup 34 extending from the finger lever 33. The lock 30 further includes a receiver 35 fixed to a lower rail 27 of the upper frame member 21. The latch 31 and the receiver 35 are positioned and dimensioned such that, when the window 20 is closed and the latch 31 and the receiver 35 are engaged. Relative movement of the upper frame member 21 and the lower frame member 23, thereby locking the window 20. Specifically, the receiver 35 includes a keeping tab 36 operatively engaging the curved latching cup 34 when the latch 31 is pivoted from an unlocked position (not shown) to a locked position.

Figure 3:
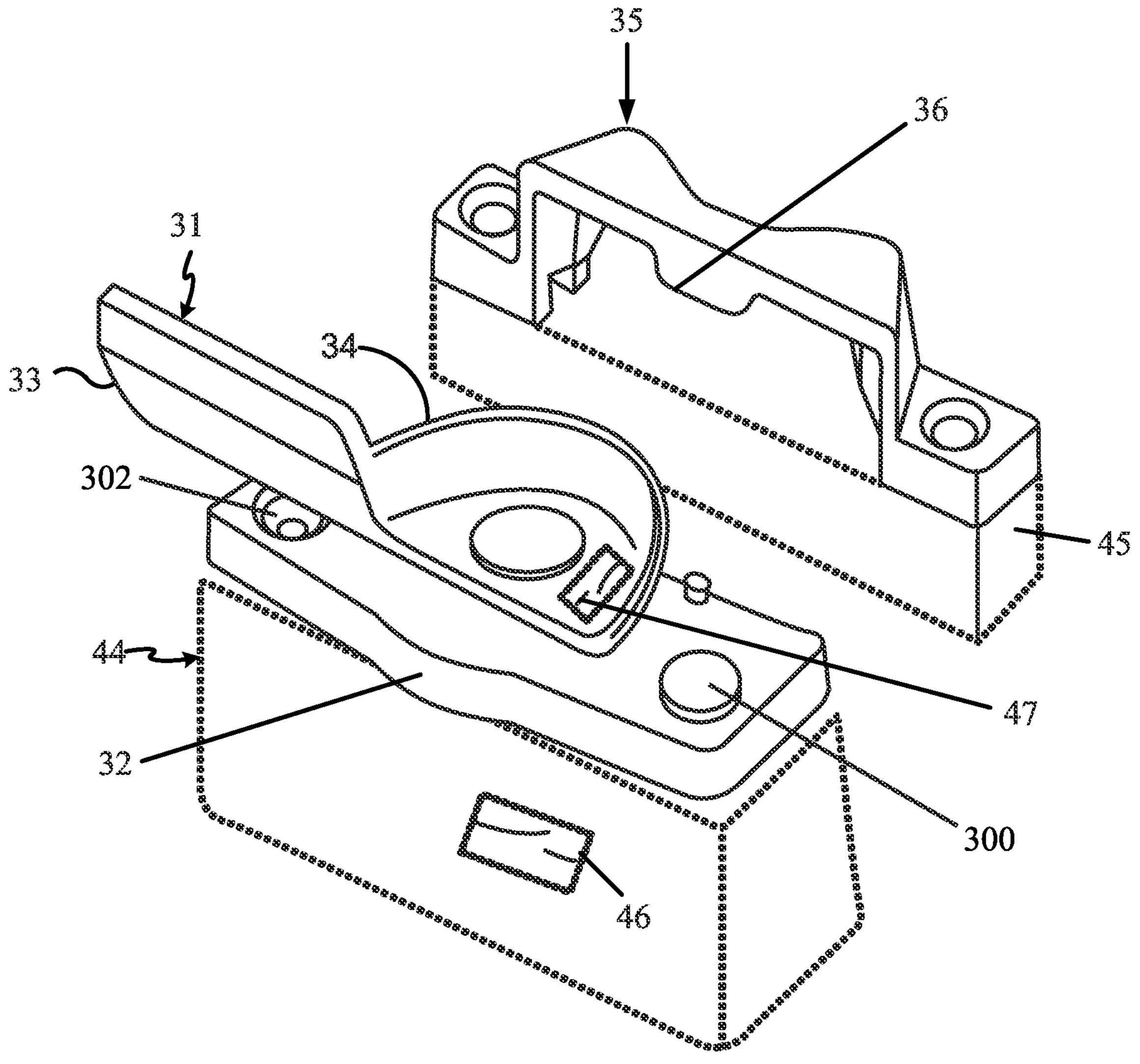
FIG. 3 illustrates a close-up view of the lock and barrier alarm shown in FIG. 2*a* for sensing the position of an upper frame member relative to a lower window frame member, in order to determine the status of a window as being open or closed.

FIG. 3 illustrates a close-up view of the lock 30 and barrier alarm (44) of FIG. 2*a* for sensing the position of the upper frame member 21 relative to the lower window frame member 23, to determine the status of the window 20 as being open or closed. In the embodiment shown in FIG. 3, the window position detector includes a magnetic member 45 mounted between the receiver 35 of the lock 30 and lower rail 27 of the upper frame member 21, and a magnetic switch 46 mounted to the upper rail 26 of the lower frame member 23. The magnetic member 45 is used to change the states of a magnetic switch 46 in response to the relative positions of the upper frame member 21 and the lower frame member 23. Specifically, when the window 20 is closed to bring the magnetic member 45 into proximity with the magnetic switch 46, a magnetic flux is generated between the magnetic member 45 and the magnetic switch 46 to change the state of the magnetic switch 46. Under such a condition, a signal indicative of the status of the window 20 as being closed is generated by the magnetic switch 46 and further sent to the transmitter 44. On the other hand, when the window 20 is opened to separate the magnetic member 45 and the magnetic switch 46, the magnetic flux is interrupted to change the state of the magnetic switch 46. Under such a condition a signal indicative of the status of the window 20 as being open is generated by the magnetic switch 46 and further sent to the transmitter 44. The transmitter 44 sends the collected status signals to central controller 116 for further processing.

Contact switch 47 serves to sense the position of the lock 30, especially the position of the latch 31, relative to the receiver 35 as well as the window 20, so as to determine the status of the lock 30 as being locked or unlocked. In one embodiment, the contact switch 47 is mounted on the support member 32 and adapted to contact the latch 31 when a user applies a force to the finger lever 33 to pivot the latching cup 34 into locked position. The window 20 is locked by the engagement of the latching cup 34 and the keeping tab 36. Once the window 20 is closed, and the contact switch 47 contacts the latching cup 34, the contact switch 47 generates a status signal indicative of the window 20 as being locked. Oppositely, when the latch 31 is pivoted to release the engagement with the keeping tab 36, the contact switch 47 is open and a status signal is generated by the contact switch 47 to indicate that the window 20 is not locked. In this way, the transition of the latch 31 from an unlocked position to a locked position is used to generate and send status signals indicative of the locking status of the window 20.

The status signal indicative of the locking status of the window 20 is sent to the transmitter 44. The transmitter 44 sends the signals to the central controller 116, which may in turn provide visual or audio indications showing whether the window 20 is locked or not based on the status signals of the lock 30. In this way, it can be ensured that the window 20 is not only closed but also locked by the lock 30. Thus, a false sense of security, incurred by the fact that the window 20 is only closed but not locked, can be eliminated.

Barrier alarm 44 further comprises a user input device 300 for use in temporarily disarming the barrier alarm. Such a device may comprise a mechanical switch (i.e., pushbutton, momentary pushbutton, toggle, slide, etc.), an opto-electrical switch, a heat sensing device (to detect the presence of a human finger), a capacitive sensor, or any other type of switch or sensor to provide an indication to the barrier alarm that a user wishes to temporarily disarm the barrier alarm. It may be desirable to temporarily disarm the barrier alarm if a user wishes to, for example, open a door or window without having to disarm the entire security system at central controller 116.

The barrier alarm shown in FIG. 3 may further comprise status indicator 302, used to convey the status of the barrier alarm as being armed or disarmed. Status indicator 302 may comprise an LED, LCD, or any other device for providing a visual status of the barrier alarm, or it may comprise a device capable of emitting audible tones, messages, alerts, etc., that also indicate a status of the barrier alarm. In one embodiment, indicator 302 comprises a multi-color LED, for example an LED package that is able to produce red light and a green light, red for indicating that the barrier alarm is disabled and green for indicating that the barrier alarm is armed. Of course, other colors may be used to differentiate between an armed and unarmed condition. In other embodiments, two or more visual indicators may be used to convey status.

It should be understood that any suitable arrangement or configuration can be used as a detector to sense the position of the lock and generate a status signal indicating the locking status of the window, such as magnets, microwave switches and optical switches. For example, the lock/unlock status may be determined by a magnetic switch and a corresponding magnetic member mounted respectively to the support member 32 and the latch 31, similar to the arrangement of the magnetic member 45 and magnetic switch 46. Furthermore, the location of the detector can be varied depending on the application circumstances of the detector. For example, the contact switch 47 may be mounted to the latch 31 instead of the support member 32.

Figure 4:
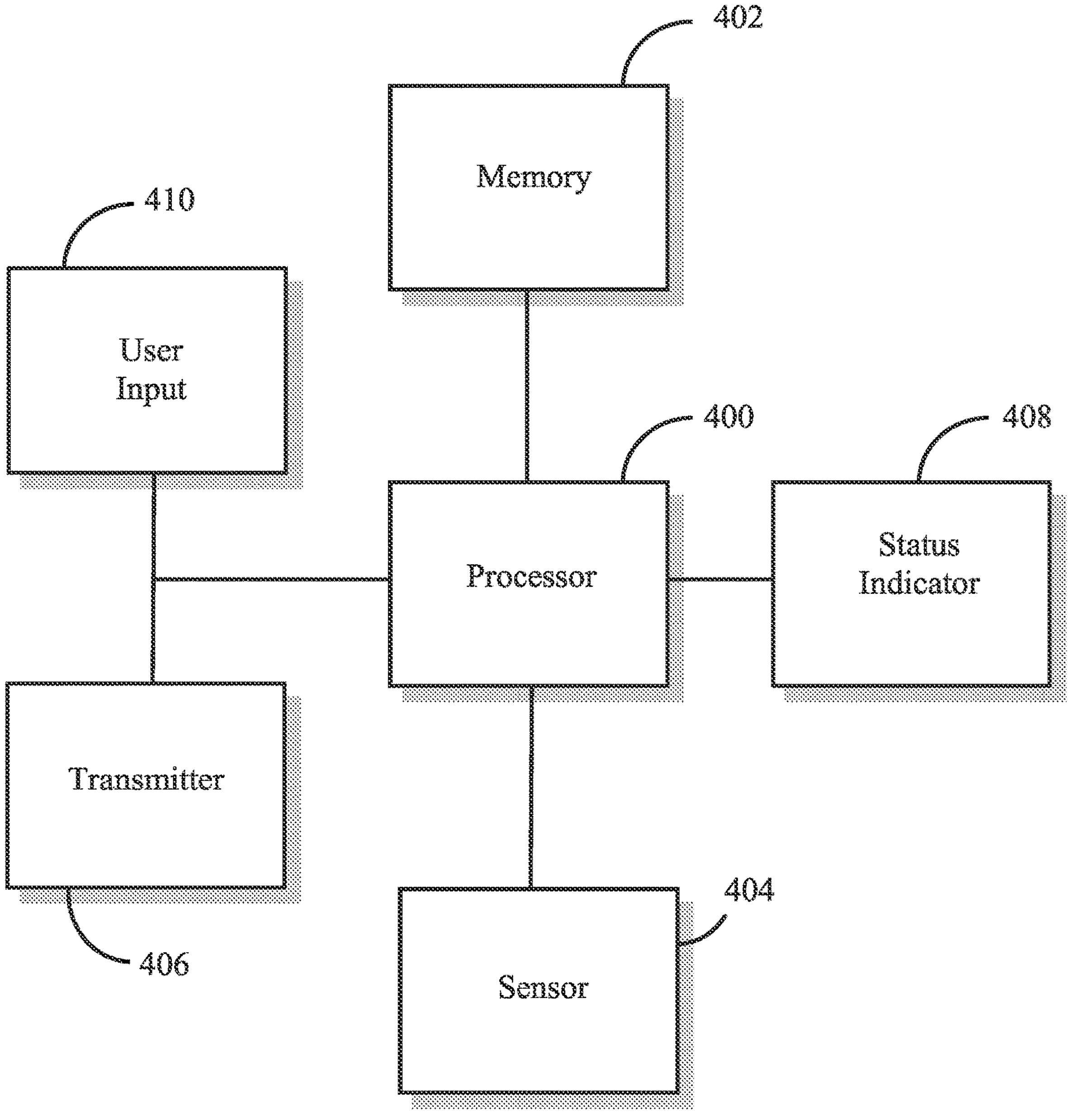
FIG. 4 is a functional block diagram of one embodiment of the barrier alarm of FIG. 2*a* or FIG. 3.

FIG. 4 is a functional block diagram of one embodiment of a barrier alarm. Specifically, FIG. 4 shows processor 400, memory 402, sensor 404, transmitter 406, status indicator 408, and user input 410. It should be understood that not all of the functional blocks shown in FIG. 4 are required for operation of the barrier alarm (for example, status indicator 408 may not be necessary), that the functional blocks may be connected to one another in a variety of ways, and that not all functional blocks are necessary for operation of the barrier alarm are shown (such as a power supply), for purposes of clarity.

Processor 400 is configured to provide general operation of the barrier alarm by executing processor-executable instructions stored in memory 402, for example, executable code. Processor 400 typically comprises a general purpose processor, such as an ADuC7024 analog microcontroller manufactured by Analog Devices, Inc. of Norwood Massachusetts, although any one of a variety of microprocessors, microcomputers, and/or microcontrollers may be used alternatively.

Memory 402 comprises one or more information storage devices, such as RAM, ROM, EEPROM, UVPROM, flash memory, SD memory, XD memory, or other type of electronic, optical, or mechanical memory device. Memory 402 is used to store processor-executable instructions for operation of the barrier alarm as well as any information used by processor 400, such as threshold information, parameter information, identification information, current or previous door or window status information, audible or visual alerts for driving status indicator 408, etc.

Sensor 404 is coupled to processor 400 and monitors or determines a state, physical condition, attribute, status, or parameter of something, such as the status of a door, window, or gate (e.g., "open", "closed", "movement detected", etc.), lamp or siren (e.g., "on" or "off"), motion detector ("motion detected" or "no motion detected"), whether a room is occupied ("yes", "no", "1", "0", etc.), whether movement is detected in a predetermined area or volume ("motion detected" or "no motion detected"), etc. Sensor 404 may comprise one or more magnet/reed switch combinations, motion detectors, Infrared detectors, audio detectors, tilt sensors, switches, light interruption sensors, accelerometers, gyroscopes, angle sensors, or other sensor to detect a change in a physical condition of a device or a change in an environment in which the device is located.

User input 410 is used for temporarily disarming the barrier alarm, comprising one or more mechanical switches (i.e., pushbutton, momentary pushbutton, toggle, slide, etc.), opto-electrical switches, heat sensing devices (to detect the presence of a human finger), capacitive sensors, or any other type of switch or sensor to provide an indication to the barrier alarm that a user wishes to temporarily disarm the barrier alarm.

Status indicator 408 is used to convey the status of the barrier alarm as being armed or disarmed. Status indicator 408 may comprise an LED, LCD, or any other device for providing a visual status of the barrier alarm, or it may comprise a device capable of emitting audible tones, messages, alerts, etc., that also indicate a status of the barrier alarm. In one embodiment, indicator 408 comprises a multi-color LED, for example an LED package that is able to produce red light and a green light, red for indicating that the barrier alarm is disabled and green for indicating that the barrier alarm is armed. Of course, other colors may be used to differentiate between an armed and unarmed condition. In other embodiments, two or more visual indicators may be used to convey status.

Transmitter 406 comprises circuitry necessary to wirelessly transmit status messages and other information from the barrier alarm to central controller 116, either directly or through in intermediate device, such as a repeater, commonly used in popular mesh networks. Such circuitry is well known in the art and may comprise BlueTooth, Wi-Fi, RF, optical, ultrasonic circuitry, among others. Alternatively, or in addition, transmitter 406 comprises well-known circuitry to provide signals to central controller 116 via wiring, such as telephone wiring, twisted pair, two-conductor pair, CAT wiring, AC home wiring, or other type of wiring.

In normal operation, processor 400 executes processor-executable instructions stored in memory 402 that causes the barrier alarm to monitor information provided by sensor 404 for changes in one or more states, physical conditions, attributes, status, or parameters of something being monitored, such as the condition of a door or window being "open" or "closed". Processor 400 uses data from the sensor to determine whether a predetermined condition has occurred relating to the barrier alarm (herein "local alarm condition"), such as a door or window being monitored by a barrier alarm changing state from "closed" to "open", a light being turned on, motion being sensed, etc. If processor 400 determines that one or more predetermined conditions have been satisfied, indicating the occurrence of a local alarm condition, it generates a local alarm message and provides the message to transmitter 406 for transmission to central controller 116. In one embodiment, the local alarm message comprises a notification to central controller 116 that a local alarm condition has been detected by sensor 404.

In one embodiment, the barrier alarm transmits a "heartbeat" or "supervisory" message at predetermined time intervals, alerting central controller 116 that the barrier alarm is active, e.g., monitoring for one or more predetermined local alarm conditions. Transmitting such a signal at regular intervals ensures that the barrier alarm has not been removed, altered, damaged, or tampered with. Such messages may be required by one or more standards-setting bodies, such as Underwriter Laboratories of Camas, Washington. If barrier alarm fails to transmit such a message at one of the scheduled time intervals, central controller 116 may declare that a local alarm condition has occurred, and perform one or more actions, such as sound an audible alert or notify remote monitoring station 124 that a local alarm condition has occurred.

When a user of the security system wishes to open a door or window, or otherwise perform an action that would normally trigger a local alarm condition by the barrier alarm, without having to disarm the entire security system at central controller 116, the user may activate a "bypass" mode of operation of the barrier alarm. This may be accomplished by the user pressing user input 202, 300, or otherwise placing the barrier alarm into the bypass mode.

In bypass mode, the barrier alarm is disarmed, meaning one or more of the following: that the barrier alarm cannot transmit information to central controller 116; that sensor 404 is disabled and can no longer sense or provide information to processor 400; that one or more predetermined events that normally result in an alarm condition are altered such that a comparison of data from the sensor to the altered event definition cannot result in an alarm condition; or that the one or more predetermined events can no longer be referenced by processor 400 (e.g., the event definitions remain unaltered, but inaccessible for comparison by processor 400 to sensor data). When the barrier alarm is in bypass mode, status indicator 408 may be illuminated or its state changed (e.g., green LED extinguished; green LED off and red LED on) to indicate to the user that the barrier alarm is in bypass mode. In one embodiment, the "heartbeat" or "supervisory" message is still transmitted to central controller 116, even when the barrier alarm is in bypass mode, so that an alarm condition generated by central controller 116 can be avoided. In another embodiment, in response to being placed in bypass mode, the barrier alarm may transmit a message to central controller 116 indicating that the barrier alarm is entering bypass mode and, as a result, the transmission of supervisory messages may be suspended until the normal mode of operation is entered.

Once the bypass mode has been entered, a user may position a door, window, gate, or other device in any position (such as opening a door, window, or gate), or may enter a room monitored by a motion sensor or passive infrared sensor, without causing central controller 116 to declare that a local alarm condition has occurred, e.g., perform one or more actions normally associated after determining that a local alarm event has occurred.

When the user wishes to re-arm the barrier alarm, e.g., enter the normal mode of operation, the user may provide an indication to the barrier alarm by using user input 202, 300, or otherwise placing the barrier alarm into the normal mode. This is normally done after the user ensures that an alarm condition will not be generated immediately upon entering the normal mode. For example, the user will typically close a door or window prior to entering the normal mode, or after a room has been cleared of any human presence.

In one embodiment, the normal mode of operation is entered automatically when a magnetic field is sensed by sensor 404 and processor 400, e.g., in an application where a magnetic door/window sensor is brought in close proximity with a magnet when a door or window is placed in a closed position. When the magnetic field is detected, it indicates that the door, window, or gate is in a closed position, and to enter the normal mode of operation.

After the normal mode of operation has been entered, status indicator 408 may be illuminated, extinguished, or its state changed (e.g., green LED illuminated; green LED illuminated and red LED extinguished) to indicate to the user that the barrier alarm is in normal mode. In one embodiment, if the "heartbeat" or "supervisory" message transmission was suspended while in bypass mode, the "heartbeat" or "supervisory" message transmission process continues. In another embodiment, in response to being placed in normal mode, the barrier alarm may transmit a message to central controller 116 indicating that the barrier alarm is entering normal mode and to begin monitoring and/or processing status messages sent by the barrier alarm in a usual manner, e.g., performing an action if the barrier alarm indicates a local alarm condition.

Figure 5:
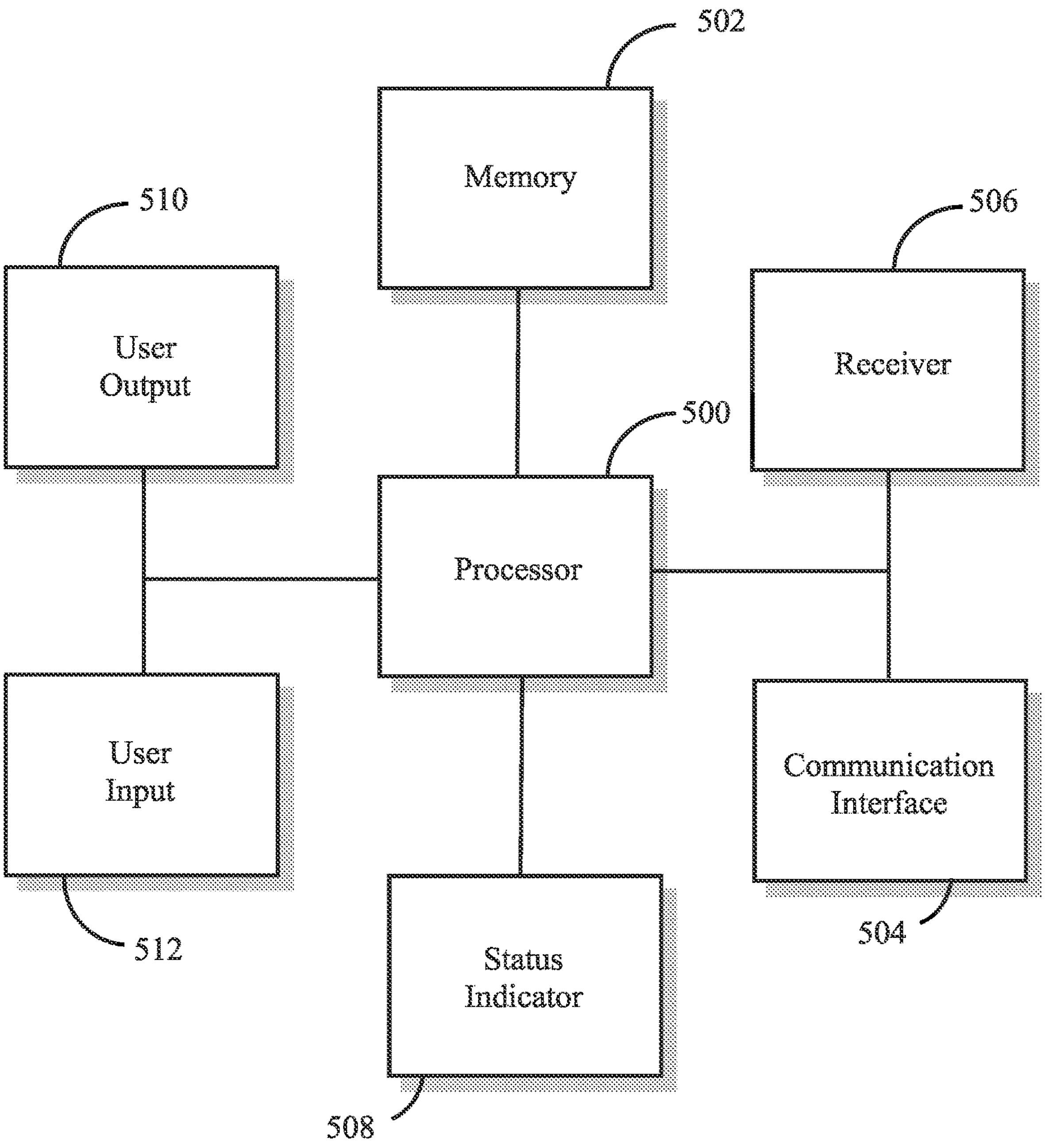
FIG. 5 illustrates a functional block diagram of the central controller shown in FIG. 1.

FIG. 5 illustrates a functional block diagram of central controller 116 shown in FIG. 1. Specifically, FIG. 5 shows processor 500, memory 502, communication interface 504, receiver 506, status indicator 508, user input 510, and user input 512. It should be understood that not all of the functional blocks shown in FIG. 5 are required for operation of central controller 116 (for example, status indicator 508 may not be necessary), that the functional blocks may be connected to one another in a variety of ways, and that not all functional blocks are necessary for operation of central controller 116 are shown (such as a power supply), for purposes of clarity.

Processor 500 is configured to provide general operation of central controller 116 by executing processor-executable instructions stored in memory 502, for example, executable code. Processor 500 typically comprises a general purpose processor, such as an ADuC7024 analog microcontroller manufactured by Analog Devices, Inc. of Norwood Massachusetts, although any one of a variety of microprocessors, microcomputers, and/or microcontrollers may be used alternatively.

Memory 502 comprises one or more information storage devices, such as RAM, ROM, EEPROM, UVPROM, flash memory, SD memory, XD memory, or other type of electronic, optical, or mechanical memory device. Memory 502 is used to store processor-executable instructions for operation of central controller 116 as well as any information used by processor 500, such as threshold information, parameter information, identification information, current or previous door or window status information, audible or visual alerts for driving status indicator 508, information relating to the type, number, and status of sensors registered with central controller 116, etc.

User input 510 comprises hardware and/or circuitry for allowing a user to interact with central controller 116. For example, a user may arm or disarm central controller 116, typically by pushing one or more keys of a keypad that comprises user input 510. When central controller 116 is armed, it typically will transmit a message to remote monitoring station 124 and/or perform one or more actions, such as sound an audible alarm and/or cause one or more lights to become illuminated, for example, if any of the barrier alarms in communication with central controller 116 indicates that a local alarm condition has occurred. The term "local alarm condition" refers to an event or condition that is detected by a barrier alarm in the security system when the barrier alarm detects the occurrence of an event, such as a door or window being opened, motion being detected, a temperature increase, a light being illuminated, a sound being detected, etc. The detection of a local alarm condition may be performed by one or more sensors, or it may be determined by central controller 116 as it receives "raw" data from the one or more sensors in the security system. For example, central controller 116 may receive data from a motion detector upon the motion detector sensing motion in a room, however central controller 116 processes this data in order to determine if a local alarm condition has occurred (e.g., whether the raw data indicates that an intruder has entered a room). In another example, a door sensor simply transmits a message to central controller 116 upon detection of a status change of the door, e.g., detecting that the door has been opened or closed. Other barrier alarms may perform processing on locally-generated data to determine if a local alarm condition has occurred. For example, a motion detector may comprise a sensor that provides data when movement is detected in a room. However, the motion detector may comprise circuitry that processes the data to determine if the movement is related, perhaps, to an animal, rather than an intruder. In this case, the motion detector may only send a "local alarm signal" to central controller 116 indicating that a local alarm condition has occurred, rather than sending any of the raw data detected by the motion detector. In another embodiment, a barrier alarm may transmit raw data as well as a local alarm signal to central controller 116.

In any case, a user of the security system may cause central controller 116 to enter an "armed" state of operation by providing input using user input 512. A user may wish to enter the "armed" state just prior to leaving a residence, for example, or prior to going to bed. When central controller 116 is in the "armed" state, it will generate a system alarm event if one or more barrier alarms indicate that a local alarm condition has occurred. However, a system alarm will not be generated if one or more barrier alarms are temporarily "bypassed" in accordance with the teachings herein. This feature may be useful to users who have already armed central controller 116, but would like to open a door or window to, for example, allow cool outside air to enter the user's bedroom, without having to physically interact with central controller 116 or disarm the entire security system.

A user may disarm central controller 116 also using user input 512, e.g., place central controller 116 in a disarmed state of operation. In this state, local alarm conditions either determined by central controller 116 or by barrier alarms themselves will not result in central controller 116 performing one or more actions normally taken when central controller 116 is in the armed state. In other words, in the disarmed state, central controller 116 will not generate a system alarm, even if a local alarm condition has occurred. A user may place central controller 116 in the disarmed state upon returning home or upon waking up, for example. In one embodiment, central controller 116 may generate an audible alert and/or cause a visual indication indicating that a local alarm condition has been determined for purposes of information for the user. The audible alert may comprise a soft, short tone or chime, while a visual indication may comprise an LED that is illuminated on central controller 116 via user output 510.

Status indicator 508 is used to convey the status of central controller 116 as being armed or disarmed, as well as providing an indication of the status of one or more barrier alarms distributed throughout the security system. Status indicator 508 may comprise one or more LEDs, LCDs, seven segment displays, an electronic display, or any other device for providing a visual status of central controller 116 and the barrier alarm(s), or it may comprise a device capable of emitting audible tones, messages, alerts, etc., that also indicate a status of central controller 116 and the barrier alarm(s). In one embodiment, a graphical user interface is displayed on an electronic display, providing a graphical display of the status of each component in the security system (e.g., central controller 116 and barrier alarms).

Receiver 506 comprises circuitry necessary to wirelessly receive messages from one or more barrier alarms distributed throughout the security system, either directly or through in intermediate device, such as a repeater, commonly used in popular mesh networks. Such circuitry is well known in the art and may comprise BlueTooth, Wi-Fi, RF, optical, ultrasonic circuitry, among others. Alternatively, or in addition, receiver 506 comprises well-known circuitry to receive messages from barrier alarms via wiring, such as telephone wiring, twisted pair, two-conductor pair, CAT wiring, AC power wires, or other type of wiring.

In one embodiment, one or more barrier alarms "heartbeat" or "supervisory" messages are received from one or more barrier alarms in the security system by receiver 506 at predetermined time intervals, alerting central controller 116 that a particular barrier alarm is active, e.g., monitoring for one or more predetermined local alarm conditions. Receiving such a signal at regular intervals ensures that the barrier alarm has not been removed, altered, damaged, or tampered with. Such messages may be required by one or more standards-setting bodies, such as Underwriter Laboratories of Camas, Washington. The failure of central controller 116 to receive such a message at one of the scheduled time intervals may be defined as a local alarm condition, causing central controller 116 to generate a system alarm and/or perform one or more actions, such as sound an audible alert or notify remote monitoring station 124 that an alarm condition has occurred.

In one embodiment, a user of the security system may wish to open a door or window, or otherwise perform an action that would normally trigger a local alarm condition by the barrier alarm, without having to disarm the entire security system at central controller 116. In that case, the user may request that central controller 116 temporarily ignore data or local alarm messages transmitted by a barrier alarm, by interacting with user input 202, 300, or otherwise requesting that central controller 116 temporarily treat the barrier alarm as unmonitored, ignored, etc.

In bypass mode, processor 500 may provide a signal to status indicator 508 to audibly or visually alert a user that a particular barrier alarm is being "bypassed". For example, status indicator 508 may be illuminated or its state changed (e.g., green LED extinguished; green LED off and red LED on) to indicate to the user that the central controller 116 will no longer perform one or more actions associated with a local alarm condition. In one embodiment, the "heartbeat" or "supervisory" message is still received, even during this bypass period. In another embodiment, central controller 116 will no longer expect the heartbeat message from any barrier alarm being bypassed.

Once central controller 116 has received the request to temporarily allow local alarm conditions to occur without taking one more actions normally associated with a local alarm condition, a user may position a door, window, gate, or other device in any position (such as opening a door, window, or gate), or may enter a room monitored by a motion sensor or passive infrared sensor, without causing central controller 116 to declare that a local alarm condition has occurred.

When a user wishes to re-arm or re-enable the barrier alarm, e.g., allow central controller 116 to take one or more actions associated with detection of a local alarm condition, the user may provide an indication to the barrier alarm by using user input 202, 300, or otherwise placing the barrier alarm into the normal mode. This is normally done after the user ensures that a local alarm condition will not be generated immediately upon entering the normal mode. For example, the user will typically close a door or window prior to entering the normal mode, or after a room has been cleared of any human presence.

In one embodiment, the normal mode of operation is entered automatically when a magnetic field is sensed by sensor 404 and processor 400, e.g., in an application where a magnetic door/window sensor is brought in close proximity with a magnet when a door or window is placed in a closed position. When the magnetic field is detected, it indicates that the door, window, or gate is in a closed position, and to enter the normal mode of operation. In that case, a request is transmitted from the bypassed barrier alarm to central controller 116, indicating that the user wishes central controller 116 to treat the bypassed barrier alarm normally.

After central controller 116 receives the request, processor 500 may once again take one or more actions associated with a local alarm condition if such a condition is determined to have occurred in relation to the barrier alarm. As a result, status indicator 508 may be illuminated, extinguished, or its state changed (e.g., green LED illuminated; green LED illuminated and red LED extinguished) to indicate to the user that the barrier alarm is in normal mode. In one embodiment, if receipt of the "heartbeat" or "supervisory" message transmission was no longer required while in bypass mode, processor 500 beings monitoring for the "heartbeat" or "supervisory" message to ensure that the barrier alarm is active.

Figure 6:
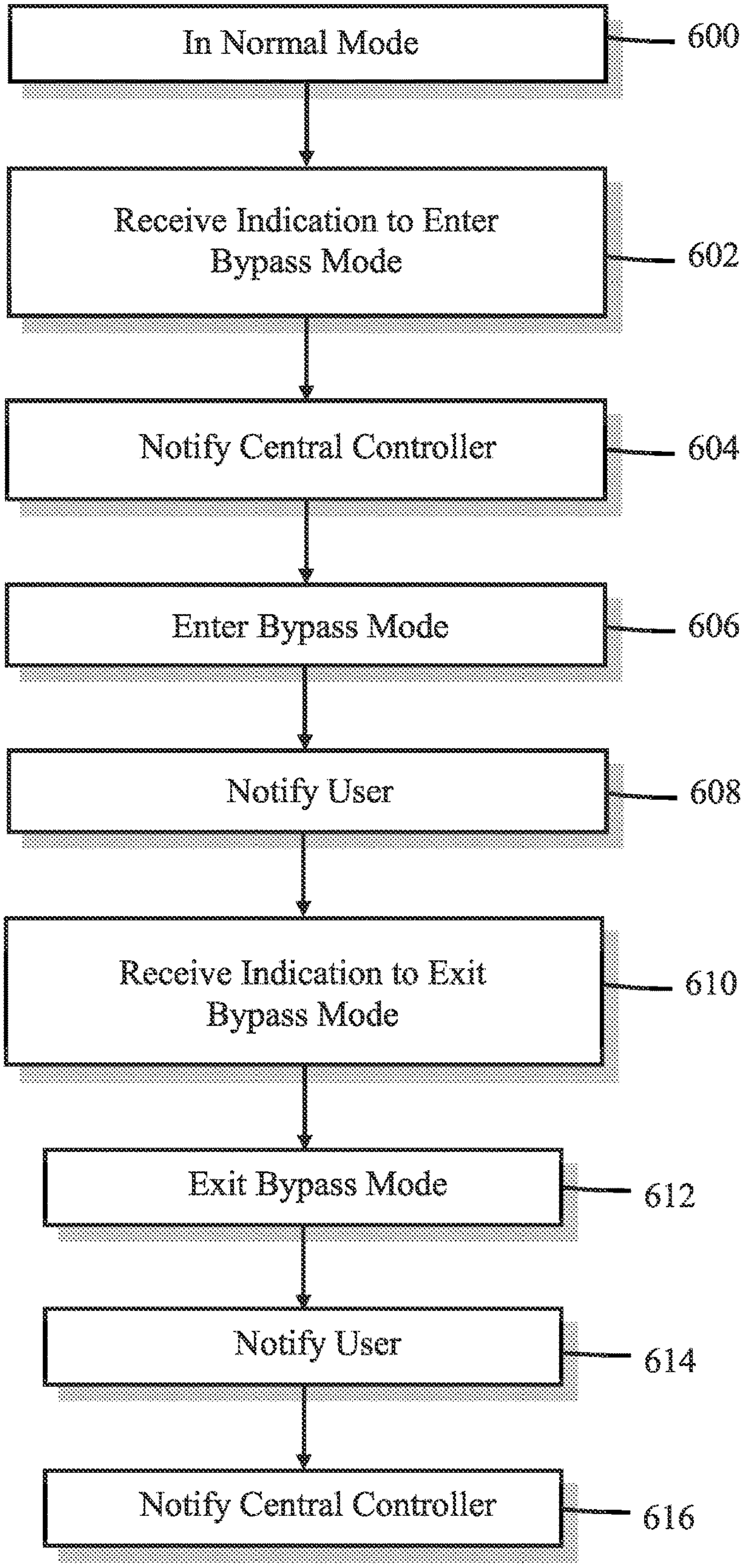
FIG. 6 is a flow diagram illustrating one embodiment of a method for temporarily disarming a barrier alarm.

FIG. 6 is a flow diagram illustrating one embodiment of a method for temporarily disarming a barrier alarm. Reference is made to the barrier alarm shown in FIG. 4, although the method could apply to virtually any type of barrier alarm. It should be understood that in some embodiments, not all of the steps shown in FIG. 6 are performed. It should also be understood that the order in which the steps are carried out may be different in other embodiments.

At block 600, a barrier alarm, such as door sensor 104 described in FIG. 1, is operating in a normal mode of operation. In the normal mode of operation, the barrier alarm monitors or determines a state, condition, attribute, status, or parameter of something, such as a door, window, or gate (e.g., "open", "closed", "movement detected", etc.), lamp or siren (e.g., "on" or "off"), motion detector ("motion detected" or "no motion detected"), an environment (e.g., temperature of a room, whether a room is occupied, whether movement is detected in a predetermined area or volume), etc. In one embodiment, in normal mode, the barrier alarm transmits a status message to central controller 116 each time a change is detected by a sensor associated with the barrier alarm. The status message typically comprises information indicative of the change, for example, a present state, e.g., "on", "off", "open", "closed", or an actual reading from a sensor part of the barrier alarm, etc. In another embodiment, the barrier alarm transmits the information received from the sensor, e.g., "raw" data.

In another embodiment, processor 400 transmits a local alarm signal to central controller 116 if processor 400 determines that a local alarm condition has occurred. For example, processor 400 compares data provided by sensor 404 to one or more parameters stored in memory 402, indicative of one or more predetermined local alarm conditions and generates a message to central controller 116 if the sensor data indicates, for example when compared to the one of the one parameters, that a local alarm condition has occurred. For example, a local alarm condition may be defined as determining that a magnetic field has been reduced below a predetermined minimum threshold; that a light has been turned on, that movement above a predetermined threshold has been detected, etc. The local alarm signal that is generated by processor 400 upon determining that a local alarm condition has occurred may comprise information relating to the condition, such as a status of a sensor/device/environment being monitored, the time that the local alarm condition was determined, an identification of the barrier alarm that generated the local alarm signal, etc.

At block 602, processor 400 receives an indication from a user of the barrier alarm that the user wishes to place the barrier alarm in a bypass mode of operation, so that the user can perform an action that would normally result in a local alarm condition, such as opening a window, door, or gate, entering a room, turning a light on, etc. The indication comprises a signal generated by the user as the user performs an act, such as pressing a button located on the barrier alarm, or otherwise providing an indication to processor 400 via user interface 410.

At block 604, processor 400 may generate a message that indicates that barrier alarm is, or about to, enter bypass mode, and provides the message to transmitter 406 for transmission to central controller 116. Upon receipt by central controller 116, central controller 116 may provide an audio or visual indication that the barrier alarm is in bypass mode.

At block 606, the barrier alarm enters bypass mode, allowing a user to perform an action that would normally result in a local alarm condition, such as opening a door or window. Bypass mode may be achieved by performing any one or a combination of the following methods:

In one embodiment, bypass mode is achieved by processor 400 disabling sensor 404. For example, processor 400 may cut power to sensor 404 or it may send an electronic signal to sensor 404 placing it into a quiescent state of operation. In any case, once disabled, sensor 404 ceases to provide data or indications of a current state, condition, attribute, status, or parameter relating to a device or environment being monitored to processor 400. Sensor 404 may, in one embodiment, provide a default signal to processor 400 in response to being disabled by processor 400. In this way, processor 400 still receives a "signal" from sensor 404 that can be used to determine whether a predetermined local alarm condition has been satisfied. The default signal from sensor 404 is typically such that it does not result in a local alarm condition being detected by processor 400.

In another embodiment, in response to receiving the indication to enter bypass mode, processor 400 simply ignores data that is provided by sensor 404, and will not generate declare a local alarm condition until the barrier alarm is placed back into the normal mode of operation.

In yet another embodiment, in response to receiving the indication to enter bypass mode, processor 400 changes one or more parameters associated with a definition of a local alarm condition. For example, in the case of barrier alarm comprising magnetic window alarm device and sensor 404 comprises a reed switch, a local alarm condition may be defined as when a reed switch contact is opened in response to removal of a magnetic field, e.g., when the window is opened. In this embodiment, processor 400 may temporarily change the parameter "open" to either "closed" or "don't care". In another example, where the barrier alarm comprises a heat sensing device, and a local alarm condition is defined as sensor 404 detecting a change in temperature exceeding a predefined amount, processor 400 may change the predefined amount to a large number, thereby precluding any chance of the alarm condition actually being met by the detected temperature reading from sensor 404.

In yet still another embodiment, in response to receiving the indication to enter bypass mode, processor 400 makes the parameter information relating to alarm conditions unavailable for comparison. If the sensor data indicates a particular state and a local alarm condition is determined by comparing the sensor data to the defined state in memory 402, processor 400 may make the defined state unavailable for comparison purposes, so that a local alarm condition can never be determined.

In another embodiment, in response to receiving the indication to enter bypass mode, transmitter 406 is disabled so that the barrier alarm cannot transmit messages to central controller 116. In one embodiment, processor 400 disables transmitter 406 by, for example, removing power to one or more circuits or circuit elements comprising transmitter 406, or by providing a digital signal that disables one or more analog or digital devices necessary for proper functionality of transmitter 406. In another embodiment, the user input provided at block 602 provides a signal directly to transmitter 406 that disables transmitter 406. For example, user input 410 may comprise a pushbutton switch that, when pressed, causes a contact within the switch to open or close. The switch could be connected to one or more components of transmitter 406 such that an opening or closing of the switch causes transmitter 406 to become unable to transmit messages. For example, the switch could be wired in series with a power transistor emitter such that, when opened, interrupts the power transistor from amplifying signals destined for an antenna.

In another, related embodiment, transmitter 406 is re-enabled at certain times in order to transmit "heartbeat" or "supervisory" messages, or some other type of message not related to sensor status or alarm conditions. For example, if a heartbeat message is transmitted every 64 minutes, processor 400 could re-enable transmitter 406 every 64 minutes in order to transmit the heartbeat message to central controller 116.

In another embodiment, in response to receiving the indication to enter bypass mode, processor 400 fails to generate a local alarm message even when it determines that a local alarm condition has occurred. In a related embodiment, local alarm messages are generated, but not provided, to transmitter 406. Other messages, such as heartbeat messages, may be generated by processor 400 and transmitted by transmitter 406.

In yet another embodiment, in response to receiving the indication to enter bypass mode, processor 400 generates a message that indicates that the barrier alarm is being placed into bypass mode, and sends the message to transmitter 406 for transmission to central controller 116. The barrier alarm continues to operate as usual, processing information received from sensor 404, comparing this information to one or more predefined alarm conditions, transmitting alarm messages if a local alarm condition is determined, and/or transmitting sensor information to central controller 116. However, central controller 116 does not take any action if an alarm message is received, or if information from sensor 404 indicates a local alarm condition, after receiving the message from processor 400 that the barrier alarm is in bypass mode.

At block 608, processor 400 provides a signal to status indicator 408 in order to alert a user that the barrier alarm has entered bypass mode. The signal may cause status indicator 408 to change state, e.g., become illuminated or extinguished, change color, emit an audible tone, or exhibit some other change.

At block 610, processor 400 receives an indication from a user of the barrier alarm that the user wishes to return the barrier alarm to the normal mode of operation. In one embodiment, the indication comprises a signal generated by the user as the user performs an act, such as pressing a button located on the barrier alarm, or otherwise providing an indication to processor 400 via user interface 410.

In another embodiment, for example in the case of a magnetic door/window sensor, the indication is generated by a component of the barrier alarm upon detecting a state, condition, attribute, status, or parameter relating to a device or environment being monitored. Typically, the user performs an act that results in generation of the indication. For example, in the case of a magnet-type door/window sensor attached to a door or window, a user may close the door or window such that the magnet and reed switch of the door/window sensor are once again in close proximity to each other. Sensor 404 detects the magnetic field produced by the magnet and sends data to processor 400 indicative of the presence of the magnetic field. Processor 400 receives the data and determines that the window or door is in a closed position by comparing the data from sensor 404 to one or more parameters stored in memory 402. In another embodiment, the mere detection of a state change of the reed switch comprises a local alarm condition. The data from sensor 404 could comprise a simple "1" or "0", or it could be an analog or digital value representing the strength of the magnetic field sensed by sensor 404. If processor 400 determines that the window or door is closed based on the data from sensor 404, this is an indication that the barrier alarm should exit bypass mode and enter a normal mode of operation, and processing continues to block 612, described below.

In yet another embodiment, the indication to exit bypass mode and enter normal mode comprises a determination that a linear or angular deceleration of a device, such as a door, window, gate, etc., and/or related barrier alarm, has exceeded a predefined threshold deceleration, in an embodiment where linear or angular acceleration/deceleration is sensed by sensor 404 when sensor 404 comprises one or more of a gyroscope, accelerometer, angle sensor, or other similar device. In this case, sensor 404 provides information to processor 400 indicative of a linear or angular velocity or acceleration/deceleration of the door/window/gate, for example as the door/window/gate stops abruptly upon being closed against a door or window frame, or a gate against a post, for example, by a user. The linear or angular velocity or deceleration is compared to one or more parameters stored in memory 402 to determine if it exceeds a predetermined threshold deceleration, indicating that the door/window/gate has been closed. If so, this is an indication that the barrier alarm should exit bypass mode and enter a normal mode of operation, and processing continues to block 612, described below.

In yet another embodiment, the indication to exit bypass mode and enter normal mode comprises a determination that a capacitance has exceeded a predefined threshold, in an embodiment where barrier alarm comprises a door/window/gate alarm and sensor 404 comprises a capacitance sensor. Capacitor sensors are well-known in the art for detecting capacitance and changes in capacitance. In this case, sensor 404 provides information to processor 400 indicative of a detected capacitance as a door/window/gate encounters a door/window frame or gate post as the door/window/gate, is closed by a user. The capacitance data provided by sensor 404 may be used by processor 400 to compare it to one or more predefined values stored in memory 402 to determine if it exceeds a predetermined threshold, indicating that the door/window/gate has been closed. If so, this is an indication that the barrier alarm should exit bypass mode and enter a normal mode of operation, and processing continues to block 612, described below.

In yet still another embodiment, the indication to exit bypass mode and enter normal mode comprises a determination that a door/window/gate has been closed based on a door/window/gate opening. In this embodiment, the opening may be measured by a proximity sensor mounted on either a movable portion of a door or window frame or a gate, positioned to measure the distance between a movable window frame edge and a fixed window edge in the case of a door or window, or between a movable gate portion and a gate post. Examples of proximity detectors comprise acoustic detectors or Infrared detectors, for instance ultrasonic sensor MB1000 LV-MaxSonar-EZ0 manufactured by Maxbotix, Inc. of Brainerd, MN, and infra-red sensor GP2Y0A21 analog distance sensor manufactured by Sharp Electronics of Mahwah, New Jersey. The proximity information provided by sensor 404 may be used by processor 400 to compare it to one or more predefined values stored in memory 402 to determine if it drops below a predetermined threshold, indicating that a door/window/gate opening has been closed. If so, this is an indication that the barrier alarm should exit bypass mode and enter a normal mode of operation, and processing continues to block 612, described below.

At block 612, processor 400 may generate a message that indicates that barrier alarm is, or is about to, enter normal mode, and provides the message to transmitter 406 for transmission to central controller 116. Upon receipt of this message, central controller 116 may provide an audible or visual indication of the barrier alarm entering normal mode either locally or remotely from central controller 116.

At block 614, the barrier alarm enters normal mode by performing any one or a combination of the following methods:

In one embodiment, where sensor 404 was disabled while in bypass mode, processor 400 may re-enable sensor 404 by restoring power to sensor 404 or it may send an electronic signal to sensor 404 placing it back into an active state of operation. In any case, in response to becoming re-enabled, sensor 404 begins to provide information relating to the state, condition, attribute, status, or parameter relating to a device or environment being monitored to processor 400.

In another embodiment, in response to receiving the indication to enter normal mode, processor 400 begins processing data provided by sensor 404 in an embodiment where processor 400 ignored this data while in bypass mode. Processor 400 may transmit this data upon a detected change in the data, or it may process the data by comparing it to one or more predetermined alarm conditions to determine whether a local alarm condition is present.

In yet another embodiment, in response to receiving the indication to enter normal mode, processor 400 re-instates one or more parameters associated with the definition of a local alarm condition in an embodiment where processor 400 changed these parameters. For example, in the case of barrier alarm comprising magnetic window alarm device and sensor 404 comprises a reed switch, a local alarm condition may be defined as when a reed switch contact is opened in response to removal of a magnetic field, e.g., when the window is opened. In this embodiment, processor 400 may re-instate the parameter indicating the status of the window from "closed" or "don't care" to "open". In another example, where the barrier alarm comprises a heat sensing device, and a local alarm condition is defined as sensor 404 detecting a change in temperature exceeding a predefined amount, processor 400 may re-instate the parameter that was originally stored in memory 402 to determine whether a local alarm condition is present or has occurred.

In yet still another embodiment, in response to receiving the indication to enter normal mode, processor 400 makes the parameter information relating to alarm conditions available for comparison once again, after an embodiment where processor 400 made the parameter information unavailable while in bypass mode. As a result, processor 400 is again able to determine alarm conditions and/or provide data from sensor 404 to central controller 116 for evaluation.

In another embodiment, in response to receiving the indication to enter normal mode, transmitter 406 is re-enabled so that the barrier alarm can transmit messages to central controller 116, in an embodiment where processor 400 disabled transmitter 406 during bypass mode. For example, if power had been removed by processor 400 at block 606, processor 400 re-applies power to transmitter 406 at block 612 by, for example, re-applying power to one or more circuits or circuit elements comprising transmitter 406, or by providing a digital signal that enables one or more analog or digital devices necessary for proper functionality of transmitter 406. In another embodiment, the user input provided at block 610 provides a signal directly to transmitter 406 that re-enables transmitter 406. For example, user input 410 may comprise a pushbutton switch that, when pressed, causes a contact within the switch to open or close. The switch could be connected to one or more components of transmitter 406 such that an opening or closing of the switch causes transmitter 406 to become able to transmit messages. For example, the switch could be wired in series with a power transistor emitter such that, when closed, allows current to flow through the power transistor so that signals destined for an antenna may be amplified.

In another embodiment, in response to receiving the indication to enter normal mode, processor 400 begins to generate local alarm messages when it determines that a local alarm condition has occurred, in an embodiment where processor 400 stopped generating such messages upon detecting a local alarm condition or change in data from sensor 404. In a related embodiment, local alarm messages are generated and also provided to transmitter 406 in an embodiment where alarm conditions were not provided to transmitter 406.

In yet another embodiment, in response to receiving the indication to enter normal mode, processor 400 generates a message that indicates that the barrier alarm is being placed into normal mode, and sends the message to transmitter 406 for transmission to central controller 116. The message instructs central controller 116 to begin processing information transmitted from the barrier alarm once again, e.g., if an alarm message is received by central controller 116, to perform one or more acts, such as sound an alarm or contact remote monitoring station 124.

At block 614, processor 400 provides a signal to status indicator 408 in order to alert a user that the barrier alarm is in normal mode. The signal may cause status indicator 408 to change state, e.g., become illuminated or extinguished, change color, emit an audible tone, or exhibit some other change.

At block 616, processor 400 generates a message that indicates that the barrier alarm has entered normal mode, and provides the message to transmitter 406 for transmission to central controller 116.

Figure 7:
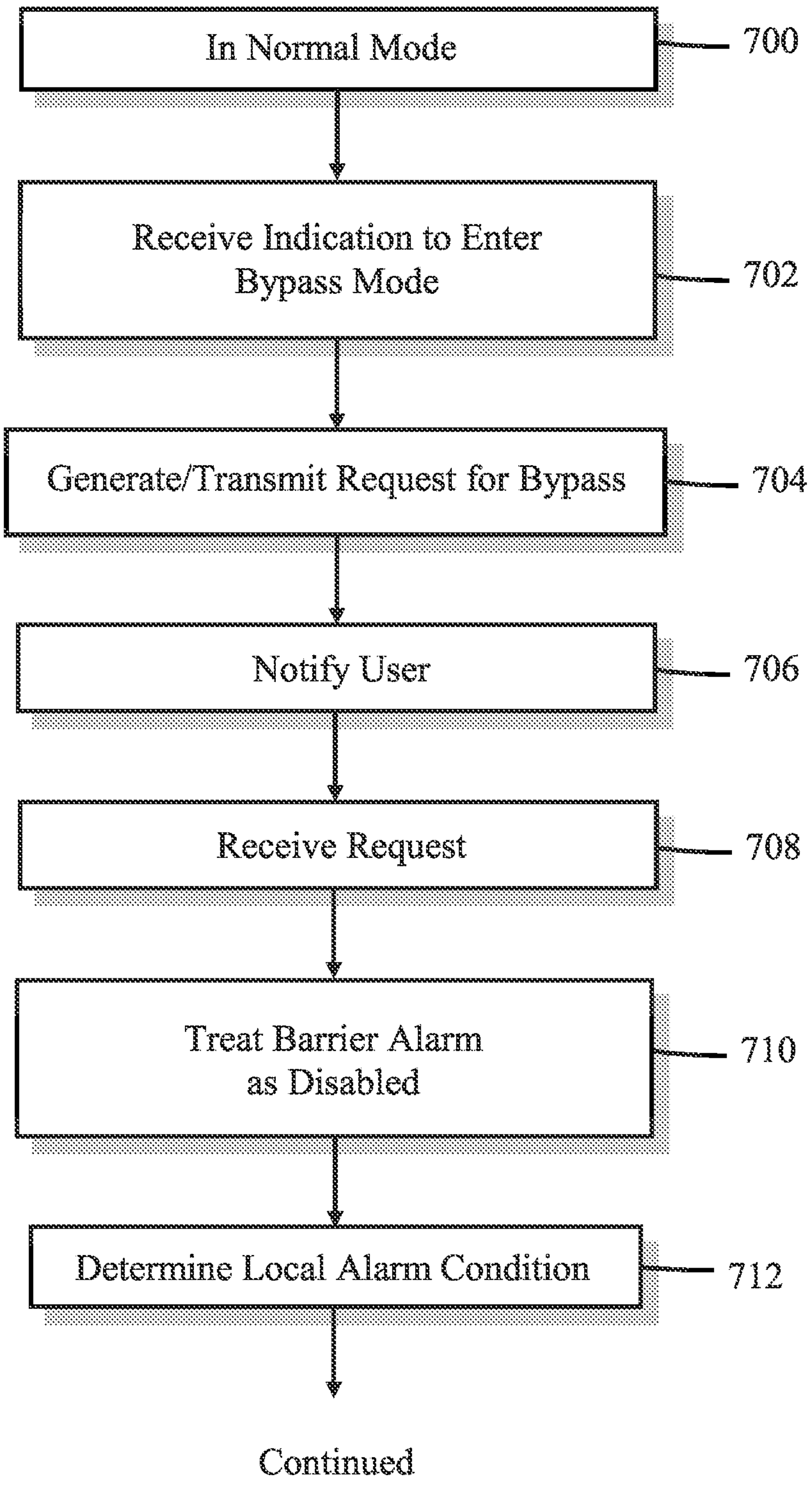
FIG. 7 is a flow diagram illustrating one embodiment of a method for temporarily permitting a predetermined alarm condition to occur in a security system comprising the barrier alarm and the central controller shown in FIG. 1.

FIG. 7 is a flow diagram illustrating one embodiment of a method for temporarily permitting a predetermined local alarm condition to occur in a security system comprising at least one of the barrier alarms and central controller 116 shown in FIG. 1. It should be understood that in some embodiments, not all of the steps shown in FIG. 7 are performed. It should also be understood that the order in which the steps are carried out may be different in other embodiments.

At block 700, a barrier alarm, such as door sensor 104 described in FIG. 1, is operating in a normal mode of operation. In the normal mode of operation, the barrier alarm monitors or determines a state, condition, attribute, status, or parameter of something, such as a door, window, or gate (e.g., "open", "closed", "movement detected", etc.), lamp or siren (e.g., "on" or "off"), motion detector ("motion detected" or "no motion detected"), an environment (e.g., temperature of a room, whether a room is occupied, whether movement is detected in a predetermined area or volume), etc. In one embodiment, in normal mode, the barrier alarm transmits a status message to central controller 116 each time a change is detected by a sensor associated with the barrier alarm. The status message typically comprises information indicative of the change, for example, a present state, e.g., "on", "off", "open", "closed", or an actual reading from a sensor part of the barrier alarm, etc.

In another embodiment, processor 400 transmits a local alarm signal to central controller 116 if processor 400 determines that a local alarm condition has occurred. For example, processor 400 may compare data sent by sensor 404 to one or more predetermined local alarm conditions and generate a message to central controller 116 if one of the one or more local alarm conditions has been satisfied. For example, a local alarm condition may be defined as determining that a magnetic field has been reduced below a predetermined minimum threshold; that a light has been turned on, that movement above a predetermined threshold has been detected, etc. The local alarm signal that is generated by processor 400 upon determining that a local alarm condition has occurred may comprise information relating to the condition, such as a status of a sensor/device/environment being monitored, the time that the alarm condition was determined, an identification of the barrier alarm that generated the alarm signal, etc.

At block 702, processor 400 receives an indication from a user of the barrier alarm that the user wishes to place the barrier alarm in a bypass mode of operation, so that the user can perform an action that would normally result in a local alarm condition, such as opening a window, door, or gate, entering a room, turning a light on, etc. The indication comprises a signal generated by the user as the user performs an act, such as pressing a button located on the barrier alarm, or otherwise providing an indication to processor 400 via user interface 410.

At block 704, in response to receiving the indication to enter bypass mode at block 702, processor 400 generates a request for central controller 116 to temporarily ignore any indications from the barrier alarm that a local alarm condition has occurred. Stated another way, the request allows a local alarm condition to occur with respect to the barrier alarm without the central controller declaring that a system alarm has occurred.

At block 706, processor 400 may provide a signal to status indicator 408 in order to alert a user that central controller 116 will no longer generate a system alarm if a local alarm condition occurs with respect to the barrier alarm. The signal may cause status indicator 408 to change state, e.g., become illuminated or extinguished, change color, emit an audible tone, or exhibit some other change. In one embodiment, processor 400 provides the signal after a predefined delay time, in order to give central controller 116 time to process the request.

At block 708, the request is received by central controller 116 and provided to processor 500. In response, processor 500 temporarily treats the barrier alarm as being bypassed, in one or more embodiments discussed below.

In one embodiment, processor 500 simply ignores messages from the alarm barrier (with the exception of a request from the barrier alarm for central controller 116 to enter a normal mode of operation with respect to the barrier alarm, e.g., take one or more actions if a local alarm condition with respect to the barrier alarm is detected). This may be accomplished in a number of ways. For example, processor 500 may determine a source of received messages and act only on messages from barrier alarms that have not sent a request for bypass.

In another embodiment, all messages are processed as they are received. However, if a local alarm condition is detected with respect to the bypassed alarm barrier, processor 500 fails to take one or more actions normally taken when a local alarm condition has occurred, such as contacting remote monitoring station 124, sounding an audible alarm, illuminating a light, etc.

After the barrier alarm has been temporarily treated as disabled at block 710, central controller 116 may receive an indication from the bypassed barrier alarm indicating that a local alarm condition has occurred with respect to the bypassed alarm at block 712. The indication may comprise a local alarm signal transmitted by the bypassed barrier alarm (e.g., the bypassed barrier alarm has determined that a local alarm condition has occurred), or it may comprise raw data from the bypassed barrier alarm that is processed by processor 500 to determine if the raw data indicates that a local alarm condition has occurred.

At block 714, processor 500 fails to take one or more actions normally taken when a local alarm condition has occurred, such as contacting remote monitoring station 124, sounding an audible alarm, illuminating a light, etc., due to the barrier alarm being treated by processor 500 as temporarily bypassed.

At block 716, at the bypassed barrier alarm, processor 400 receives an indication from a user of the barrier alarm that the user wishes to have central controller 116 treat the bypassed barrier alarm normally, e.g., taking one or more actions normally taken when a local alarm condition has occurred, such as contacting remote monitoring station 124, sounding an audible alarm, illuminating a light, etc. In one embodiment, the indication comprises a signal generated by the user as the user performs an act, such as pressing a button located on the barrier alarm, or otherwise providing an indication to processor 400 via user interface 410.

At block 718, in response to receiving the indication to exit bypass mode at block 716, processor 400 generates a request for central controller 116 to treat the bypassed barrier alarm as normal. The request is then transmitted to central controller 116 via transmitter 406.

At block 720, processor 400 may provide a signal to status indicator 408 in order to alert a user that central controller 116 will now treat the barrier alarm as normal, e.g., a system alarm will be generated if a local alarm condition is detected. The signal may cause status indicator 408 to change state, e.g., become illuminated or extinguished, change color, emit an audible tone, or exhibit some other change.

At block 722, the request is received by central controller 116 and provided to processor 500. In response, processor 500 treats the barrier alarm as normal, generating a system alarm if a local alarm condition is detected and/or performing one or more actions in response thereto.

At block 724, processor 400 may provide a signal to status indicator 508 in order to alert a user that central controller 116 will now treat the barrier alarm as normal, e.g., a system alarm will be generated and/or one or more actions taken if a local alarm condition is detected. The signal may cause status indicator 408 to change state, e.g., become illuminated or extinguished, change color, emit an audible tone, or exhibit some other change.

The methods or algorithms described in connection with the embodiments disclosed herein may be embodied directly in hardware or embodied in processor-readable instructions executed by a processor. The processor-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components.

Accordingly, an embodiment of the invention may comprise a computer-readable media embodying code or processor-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

We claim:

1. A method performed by a security system control device having a processor in a security system for bypassing a barrier alarm monitored by the security system control device, the method comprising:

receiving, by the processor, a command to bypass the barrier alarm directly from a user via use of a wireless communication device wirelessly coupled to the security system control device;

storing, by the processor, an indication in a memory coupled to the processor indicating that the barrier alarm has been bypassed; and while the barrier alarm is bypassed:

receiving, by the processor via a receiver coupled to the processor, an alarm signal from the barrier alarm, the alarm signal comprising an identification of the barrier alarm;

in response to receiving the alarm signal, determining, by the processor, from the indication stored in the memory whether the barrier alarm has been bypassed;

ignoring, by the processor, the alarm signal when the barrier alarm has been bypassed; and generating an alarm condition when a predetermined message is not received from the barrier alarm within a predetermined amount of time.

2. The method of claim 1, wherein the command to bypass the barrier alarm comprises an instruction to ignore, by the processor, future alarm signals received from the barrier alarm of a plurality of barrier alarms monitored by the security system control device.

3. The method of claim 1, further comprising: in response to receiving the command to bypass the barrier alarm, transmitting, by the processor via a communication interface, a message to a remote location indicating that the barrier alarm has been bypassed.

4. The method of claim 1, further comprising: receiving, by the processor, a second command to bypass a second barrier alarm from a second barrier alarm; receiving, by the processor, a second alarm signal; storing, by the processor, a second indication in the memory coupled to the processor indicating that the second barrier alarm has been bypassed; in response to receiving the second alarm signal, determining, by the processor, from the second indication stored in the memory whether the second barrier alarm has been bypassed; and ignoring, by the processor, the second alarm signal when the second barrier alarm has been bypassed.

5. The method of claim 1, wherein the first mode of operation is armed-home and the second mode of operation is armed-away.

6. The method of claim 1, further comprising: in response to receiving the further command to change the operating mode of the security system, providing, by the processor, an indication that the barrier alarm has changed status from being bypassed to being monitored.

7. The method of claim 1, wherein the command to bypass the barrier alarm comprises a first identification of the barrier alarm, and the indication comprises the first identification, and determining whether the barrier alarm has been bypassed after receiving the alarm signal comprises: comparing the first identification with the identification stored in the memory; and determining that the barrier alarm is bypassed when the first identification matches the identification stored in the memory.

8. A security system control device used in a security system for bypassing one or more barrier alarms monitored by the security system control device, comprising:

a receiver for receiving wireless signals;

a memory for storing processor-executable instructions;

a processor, coupled to the receiver and the memory, for executing the processor-executable instructions that causes the security system control device to:

receive a command, by the processor, provided directly to the security system control device from a user to bypass a first barrier alarm of the plurality of barrier alarms, wherein the command to bypass the first barrier alarm comprises an instruction to ignore, by the processor, future alarm signals received from the first barrier alarm;

store, by the processor, an indication in the memory that the first barrier alarm has been bypassed; and while the first barrier alarm is bypassed:

receive, by the processor, an alarm signal from the first barrier alarm, the alarm signal comprising an identification of the first barrier alarm;

in response to receiving the alarm signal, determine, by the processor, from the indication stored in the memory whether the first barrier alarm has been bypassed;

ignore, by the processor, the alarm signal when the first barrier alarm has been bypassed; and generate an alarm condition when a predetermined message is not received from the first barrier alarm within a predetermined amount of time.

9. The security system control device of claim 8, wherein the processor-executable instructions comprise further instructions that cause the security system control device to: in response to receiving the command to bypass the first barrier alarm, provide, by the processor, a message to a remote location indicating that the first barrier alarm has been bypassed.

10. The security system control device of claim 8, further comprising processor-executable instructions that causes the security system control device to: receive, by the processor, a second command to bypass a second barrier alarm from a second barrier alarm; storing, by the processor, a second indication in the memory coupled to the processor indicating that the second barrier alarm has been bypassed, receive, by the processor, a second alarm signal; in response to receiving the second alarm signal, determine, by the processor, from the second indication stored in the memory whether the second barrier alarm has been bypassed; and ignore, by the processor, the second alarm signal when the second barrier alarm has been bypassed.

11. The security system control device of claim 8, wherein the first mode of operation is armed-home and the second mode of operation is armed-away.

12. The security system control device of claim 8, wherein the processor-executable instructions comprise further instructions that cause the security system control device to: in response to receiving the further command to change the operating mode of the security system, provide, by the processor, an indication that the first barrier alarm has changed status from being bypassed to being monitored.

13. The security system control device of claim 8, wherein the command to bypass the first barrier alarm comprises a first identification of the first barrier alarm, and the indication comprises the first identification, and the processor-executable instructions that causes the security system control device to determine whether the first barrier alarm has been bypassed after receiving the alarm signal comprises instructions that cause the security system control device to: compare the first identification with the identification stored in the memory; and determine that the first barrier alarm is bypassed when the first identification matches the identification.

* * * * *